(12) United States Patent
Sugiyama (10) Patent No.: US 8,300,314 B2
(45) Date of Patent: Oct. 30, 2012

(54) DISPLAY DEVICE

(75) Inventor: Takashi Sugiyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 40 days.

(21) Appl. No.: 12/892,525

(22) Filed: Sep. 28, 2010

(65) Prior Publication Data

US 2011/0075267 A1 Mar. 31, 2011

(30) Foreign Application Priority Data

Sep. 28, 2009 (JP) ................................ 2009-222341

(51) Int. Cl.
*G02B 27/14* (2006.01)
(52) U.S. Cl. ....................................... 359/630; 359/631
(58) Field of Classification Search .................. 359/630, 359/631
See application file for complete search history.

(56) References Cited

U.S. PATENT DOCUMENTS

2009/0237803 A1* 9/2009 Hotta et al. ................... 359/630

FOREIGN PATENT DOCUMENTS

| EP | 2 009 469 A1 | 12/2008 |
| JP | 2008-70415 A | 3/2008 |
| WO | 2007/116639 A1 | 10/2007 |

* cited by examiner

*Primary Examiner* — James Jones
(74) *Attorney, Agent, or Firm* — Kenealy Vaidya LLP (57) ABSTRACT

A display device includes: a display part containing a first display region visually recognized by a viewer; an object of view arranged in a second display region; an imaging optical system of real specular image for defining a first space in which the first display region exists and a second space in which the second display region exists, the imaging optical system of real specular image including a semitransparent substrate with a plane of symmetry, the imaging optical system of real specular image forming a real image of the object of view in the first space of the first display region with light passing through the substrate; and a half mirror arranged in the first space of the first display region, the half mirror reflecting light beams emitted from the imaging optical system of real specular image to guide the reflected light beams to the viewer, while allowing an image formed in the first display region to be seen by the viewer.

6 Claims, 9 Drawing Sheets

DISPLAY DEVICE

This application claims the priority benefit under 35 U.S.C. §119 of Japanese Patent Application No. 2009-222341 filed on Sep. 28, 2009, which is hereby incorporated in its entirety by reference.

BACKGROUND OF THE INVENTION

1. Field of the Invention

The present invention relates to a display device for allowing a viewer to see a real image of an object of view formed in the air by using an imaging optical system of real specular image.

2. Description of the Related Art

A display device is suggested (see WO2007/116639), in which a viewer is allowed to see a real image of an object of view, i.e., real specular image formed in the air by using an imaging optical system of real specular image.

This display device includes an object of view arranged in a space opposite to a viewer, and an imaging optical system of real specular image for forming a real image of the object of view in a space in which the viewer exists. A real image of the object is formed at a position symmetrical to the object with respect to a plane of symmetry (element surface) of the imaging optical system of real specular image.

In one example, a floating image is presented in a space in front of an image display surface such as that of an electronic display, or in a space in front of a display device of some kind of equipment such as an instrument panel of an automobile (namely, in a space in which a driver (viewer) exists). This will be regarded as suggesting a new way of image display. As a specific example, while watching a situation outside an automobile through a windshield while driving, a driver sometimes looks at an instrument panel to check on a speed, the number of revolutions of an engine, time and others. In the case, for example, of overspeed, it is assumed that a floating indication for calling attention is given in a space in front of the instrument panel in which nothing is originally expected to exist. This attracts attention of the driver more than an indication given on the instrument panel showing the overspeed, thereby contributing to prevention of traffic accidents.

The present inventors have suggested a display device (as Japanese Patent Application No. 2008-70415). According to this display device, a display part and an object of view are spatially separated, and an indication on the display part and a real image of the object formed by an imaging optical system of real specular image are simultaneously displayed in the sightline of a viewer. This means that the viewer is allowed to see a real image of the object formed in front of the display part, while seeing the display part arranged on a back wall behind the real image. In this display device, the viewer normally sees only the display part, and a real image of the object is formed in a space in front of the display part only on the occurrence of a certain event, for example. In this case, an image appears in the space in which nothing is originally expected to exist. This provides a way of image view that more attracts attention of the viewer.

However, even if the method disclosed in WO2007/116639 is applied to this display device, an imaging optical system of real specular image is still required behind a real image in order to see a real image. Accordingly, the viewing location of the viewer is limited to a position tilted 45 degrees from the element surface of the imaging optical system of real specular image. This means that an indication on the display part on the back wall and a real image cannot be superimposed when seen by the viewer.

Furthermore, the imaging optical system of real specular image can only form real images, meaning that an impressive image such as the one that is partially made stereoscopic cannot be formed.

In the method of WO2007/116639, a resultant floating image is fixed in position and in size as an object of view is fixed. Accordingly, except for being a floating image, the resultant image is not impressive.

SUMMARY OF THE INVENTION

In view of the above-mentioned problems, an object of the present invention is to provide a display device capable of freely setting a viewpoint (angle) from which an image formed by an imaging optical system of real specular image is seen.

The display device according to the present invention is characterized by including: a display part containing a first display region visually recognized by a viewer; an object of view arranged in a second display region; an imaging optical system of real specular image for defining a first space in which the first display region exists and a second space in which the second display region exists, the imaging optical system of real specular image including a semitransparent substrate with a plane of symmetry, the imaging optical system of real specular image forming a real image of the object of view in the first space of the first display region with light passing through the substrate; and a half mirror arranged in the first space of the first display region, the half mirror reflecting light beams from the imaging optical system of real specular image to guide the reflected light beams to the viewer, while allowing an image formed in the first display region to be seen by the viewer.

In the present invention, light beams from the imaging optical system of real specular image are caused to turn back by the first half mirror arranged in the first space of the first display region, and are then guided to the viewer. Accordingly, a viewpoint (angle) from which an image is seen is freely set. Furthermore, the viewer can see an indication on the display part on a back wall and a real image superimposed on each other.

In the present invention, if depending on a positional relationship among the object, the imaging optical system of real specular image and the first half mirror, then a floating image seen by the viewer may be a real image formed by the imaging optical system of real specular image and the first half mirror, alternatively a floating image seen by the viewer may be a virtual image formed by the first half mirror from a real image formed by the imaging optical system of real specular image. Further, in case the first half mirror is arranged to cross a real image, i.e., real specular image, then resultant images are seen as an image sticking out of a first half mirror surface with part thereof formed as a real image and other part thereof formed as a virtual image. In this case, a very impressive image to be seen is formed. Specifically, the viewer sees a floating image of the object as a virtual image if the image is in a space (of the back wall) behind the first half mirror, while seeing the same as a real image if the image is in a space (of the viewer) in front of the first half mirror. Accordingly, the viewer is allowed to see an indication on the back wall and a floating image at any position in front of the back wall that are superimposed on each other.

Variation of the positional relationship thereamong with time results in change of the position of a floating image with time. Specifically, if the object is moved along a line connecting the object and the imaging optical system of real specular image, an image may be formed at various positions. Accordingly, an image to be formed by the first half mirror surface may gradually be changed from a completely virtual image to a completely real image, thereby making an image to be seen more impressive.

In order to move the object, a method or means to mechanically move the object attached to a guide rail by using the operation of a motor and the like may be applicable. Compact light sources such as LEDs may also be arranged in line to control a place of light emission. Thus, the display device includes means to change a positional relationship among the object, the imaging optical system of real specular image and the first half mirror with time. Or, the display device includes means to move the object along a straight line connecting the object and the imaging optical system of real specular image.

A range of movement of the object is controlled such that the viewer can see both a real image formed by the imaging optical system of real specular image and the first half mirror, and a virtual image formed by the first half mirror from a real image formed by the imaging optical system of real specular image.

In the present invention, the imaging optical system of real specular image is such that it allows a real image of the object to be seen from a viewpoint tilted from the plane of symmetry (substrate). A specific example of the imaging optical system of real specular image is the one with a dihedral corner reflector array. The dihedral corner reflector array is constructed of a number of dihedral corner reflectors arranged two-dimensionally each having two orthogonal mirror surfaces. A common flat surface orthogonal to all mirror surfaces is defined as an element surface with respect to which the object and a real image are symmetrical to each other. Each light beam emitted from the object is reflected once by each of the two mirror surfaces of each of the dihedral corner reflectors. Each reflected light beam is then caused to pass through the element surface of the dihedral corner reflector array. As a result, a real image of the object is formed at a position symmetrical to the object with respect to the element surface of the dihedral corner reflector array.

In order to suitably bend each light beam by each of the dihedral corner reflectors and allows the light beam to pass through the element surface, inner walls of optical holes defined in a direction in which the holes penetrate the element surface are used as respective mirror surfaces of the dihedral corner reflectors of the dihedral corner reflector array. These dihedral corner reflectors are described conceptually, and are not required to reflect a shape determined, for example, by physical boundaries. As an example, the optical holes may not be separated, but may be coupled to each other.

In simple terms, the dihedral corner reflector array is constructed of a large number of mirror surfaces substantially orthogonal to the element surface and arranged on the element surface. What should be taken into account in terms of structure is how the mirror surfaces are fixedly supported on the element surface. As an exemplary specific way of forming the mirror surfaces, a substrate for defining predetermined spaces is provided to have a plane in which the dihedral corner reflector array is arranged as an element surface and then inner walls of each optical hole are used as mirror surfaces of each of the dihedral corner reflectors where the optical holes are made so as to penetrate the element surface. The holes formed in the substrate are only required to be transparent for allowing respective light beams to pass therethrough. By way of example, the holes may be evacuated. Or, the holes may be filled with transparent gas or transparent liquid. The shape of each hole may arbitrarily be determined, as long as the holes each have one mirror surface on its inner wall functioning as a unit optical element, or two or more of such mirror surfaces not existing on the same plane, and each light beam reflected by the mirror surface is allowed to pass through the corresponding hole. The holes may be coupled, or may be of complicated structures as a result of their partial losses. As another example, different independent mirror surfaces stand together in large numbers on a surface of a substrate. In this case, it is understood that holes formed in the substrate are coupled to each other.

Further, the dihedral corner reflectors may be formed using a solid substance such as transparent glass or resin to have a prism or cylindrical shape as the optical hole. In the case where each cylindrical member is formed from a solid substance, the cylindrical members may be arranged close to each other to function as a support member of the elements. Also, if the dihedral corner reflector array has a substrate, the cylindrical members may project from a surface of the substrate. The shape of the cylindrical members may also arbitrarily be determined, as long as the cylindrical members each have one mirror surface on its inner wall, or two or more of such mirror surfaces not existing on the same plane that allow the cylindrical member to function as a dihedral corner reflector, and each light beam reflected by the mirror surface is allowed to pass therethrough. Although called cylindrical members, they may be coupled, or may be of a complicated structure as a result of their partial losses.

A shape of the optical hole should be considered, wherein all of the adjacent inner wall surfaces are orthogonal, as in a cube or a rectangular parallelepiped. In such a case, the gaps between adjacent dihedral corner reflectors can be minimized, and thereby highly dense arrangements are possible. It is preferable that reflection be prevented by a surface other than that of a dihedral corner reflector that faces an object of view.

In the case where a dihedral corner reflector has a plurality of inner mirror surfaces, some of the transmitted light may undergo multiple reflections, i.e., there may occur multiple reflections of light beams passing through the hole several times or more than that of assumed reflections. Regarding countermeasures for these multiple reflections, if two mutually orthogonal mirror surfaces are formed on the inner wall of an optical hole, such multiple reflection is prevented in the following ways. In one way, a surface other than these two mirror surfaces may be made non-specular to prevent reflection of light beams by this surface. In another way, a surface other than these mirror surfaces may be tilted from an element surface so that it may not orthogonal to the element surface, or may be curved. In either way, generation of the multiply reflected light beam reflected three times or more may be reduced, or prevented. In order to form a non-specular surface, the following configuration may be used in which a target surface may be coated with an anti-reflection coating or a thin film and, alternatively, the surface roughness of the target surface may be increased to cause diffuse reflection on the target surface. In addition, the existence of a transparent and flat substrate does not obstruct the functions of the optical element, and therefore any appropriate substrate may be used as a supporting member and/or a protective member.

In order to enhance the brightness level of a real image to be projected, it is desirable that a number of dihedral corner reflectors arranged on an element surface are as close as possible to each other. As an example, lattice arrangement of the dihedral corner reflectors is effective. Such an arrangement makes it easy to manufacture a display device, as a merit. A mirror surface of each dihedral corner reflector may be a flat surface for causing reflection of light beams, and which is made of a lustrous substance such as metal or resin, regardless of whether the substance is solid or liquid. A mirror surface of a dihedral corner reflector may also be such that it causes reflection or total reflection at a flat boundary interface between transparent media of different refractive indexes. In the case where a total internal reflection is used for the mirror surface, it is highly likely that the undesirable multiple reflections by the plurality of multiple mirror surfaces will exceed the critical angle of the total internal reflection, and therefore it is expected that these undesirable multiple reflections will naturally be suppressed. Additionally, the mirror surface may either be formed only on a limited part of the inner wall of an optical hole, or may be constructed of a plurality of unit mirror surfaces arranged in parallel, as long as each mirror surface serves its function without problems. Regarding the latter aspect, in other words, the formation of a mirror surface from unit mirror surfaces means that a mirror surface may be divided into a plurality of unit mirror surfaces. In this case, the unit mirror surfaces are not necessarily required to exist on the same plane, but are parallel. Furthermore, the unit mirror surfaces may be contact with each other, or may be spaced from each other.

Another specific example applicable in the present invention as an imaging optical system of real specular image is an optical system including a retroreflector array for causing retroreflection of light beams, and a second half mirror with a second half mirror surface for reflecting light beams and causing the light beams to pass therethrough. In this imaging optical system of real specular image, the second half mirror surface functions as a plane of symmetry, and the retroreflector array is arranged at a position that can cause retroreflection of light beams emitted from an object of view, and reflected by or passing through the second half mirror. The retroreflector array is arranged only in the second space defined by the second half mirror, and in which an object of view also exists. The position of the retroreflector array is such that light beams reflected by the second half mirror are retro-reflected by the retroreflector array. Herein "Retroreflection", that is the operation of a retroreflector, is a phenomenon in which each reflected light beam is reflected back to where it originated (or reversely reflected), thus the incoming light beam and the reflected light beam are parallel to each other and in opposite directions. A number of retroreflectors are arrayed to constitute the retroreflector array. If each of the retroreflectors is sufficiently small in size, paths of an incoming light beam and a reflected light beam are considered to overlap. The retroreflectors of the retroreflector array are not required to be on a plane surface, but may be on a curved surface. Furthermore, these retroreflectors are not required to be on the same plane, but may be scattered three-dimensionally. In addition, the second half mirror has two functions to cause light beams to pass therethrough and to reflect light beams. A ratio between the transmittance and the reflectivity of the second half mirror is ideally 1:1.

There may be utilized a retroreflector constructed of three adjacent mirror surfaces (called a "corner reflector" in a broad sense). Alternatively, a cat's eye retroreflector may be used as the retroreflector. As an example, a corner reflector is constructed of three mirror surfaces orthogonal to each other. As another example, the corner reflector has three adjacent mirror surfaces, where two of angles defined by the mirror surfaces are both 90 degrees, and the other angle is 90/N (where N is an integer) degrees. As still another example, the corner reflector is also an acute angle retroreflector with three mirror surfaces, where angles defined by three mirror surfaces are 90 degrees, 60 degrees and 45 degrees respectively.

If the imaging optical system of real specular image including the aforementioned retroreflector array and the second half mirror is used, some light beams emitted from an object of view are reflected by the second half mirror surface. Then, the reflected light is retro-reflected by the retroreflector array to return to where it originated in all cases, and then passes through the second half mirror surface. As a result, an image of the object is formed. Accordingly, as long as the retroreflector array is placed at a position that allows receipt of reflected light beams from the second half mirror, the shape and the position of the retroreflector array are not limited. A real image thereby formed is seen in a direction opposite to light beams passing through the second half mirror surface.

An example of an object of view is an indication fixedly displayed such as a neon sign, or that fixedly displayed on a display panel (such as an emergency lamp constructed of a light source and a display panel). Another example of an object of view is an image displayed on a display surface of an electronic display such as a liquid crystal display, a CRT display and an organic EL display. Still another example of an object of view is an array light source given by arranging compact light sources such as LEDs in line and controlling a place of light emission. A display part described next is suitably applied in the display device of the present invention as the display part arranged on the back wall at a retracted position. Examples of the display part include that of an image display device that is an electronic display such as a liquid crystal display, a CRT display and an organic EL display, that of a mechanical device such as an instrument panel, and the like.

According to the present invention, light beams from the imaging optical system of real specular image are caused to turn back by the first half mirror in the first space of the first display region (in which a viewer exists), and are then guided to the viewer. Therefore, a viewpoint (angle) from which an image is seen can freely be set. Furthermore, an indication on the back wall and a real image are superimposed on each other when they are seen. If the first half mirror is arranged to cross a real image, i.e., real specular image, then resultant images are seen as an image sticking out of the first half mirror surface with part thereof formed as a real image and other part thereof formed as a virtual image. In this case, a very impressive image to be seen is formed. A floating image to be seen by a viewer may be a real image, a virtual image, or combination of actual and virtual images determined according to a positional relationship among an object of view, the imaging optical system of real specular image and the first half mirror. Thus, the viewer is allowed to see an indication on the back wall and a floating image at any position in front of the back wall that are superimposed on each other.

BRIEF DESCRIPTION OF THE DRAWINGS

The aforementioned aspects and other features of the present invention are explained in the following description, taken in connection with the accompanying drawing figures wherein.

DETAILED DESCRIPTION OF THE INVENTION

A display device of an embodiment according to the present invention will be described herein below by referring to the drawings.

Figure 1:
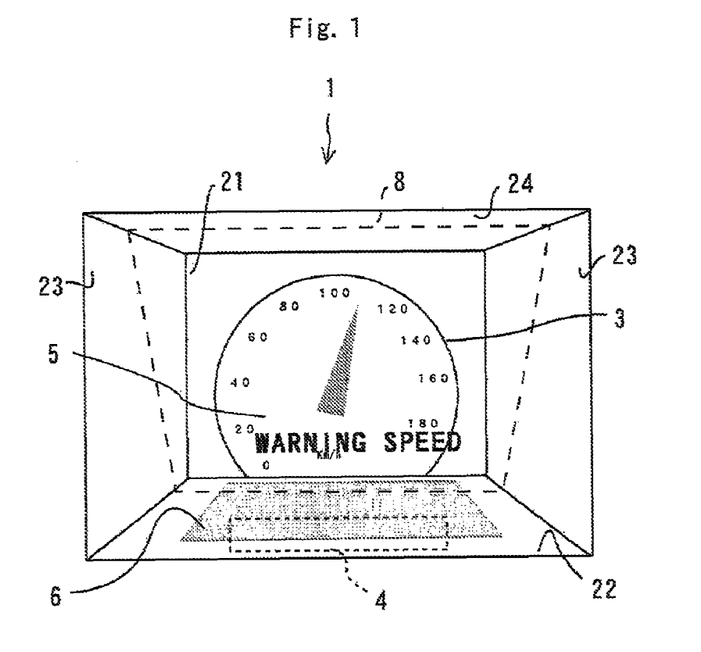
FIG. 1 is a schematic front view illustrating a display device of an embodiment of the present invention when viewed from a viewer.
Figure 2:
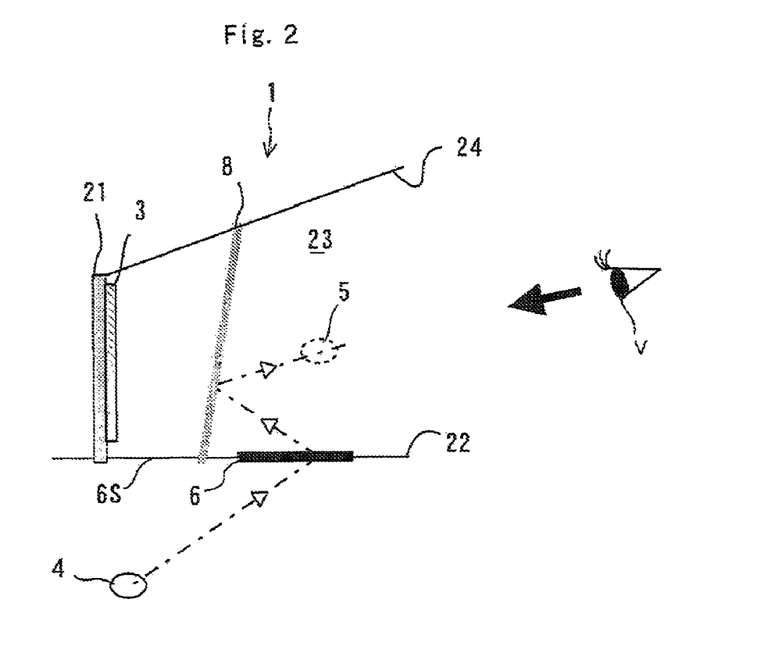
FIG. 2 is a schematic cross-sectional side view illustrating a principal part of the display device of the embodiment when viewed from a side.
Figure 3:
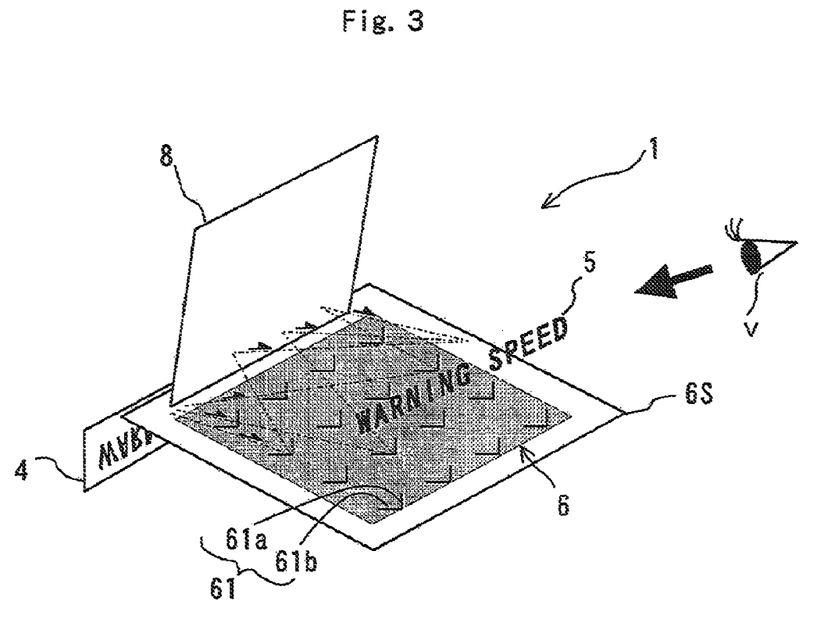
FIG. 3 is a schematic perspective view illustrating a principal part of the display device of the embodiment when viewed from the viewer.

FIG. 1 is a schematic front view illustrating an instrument panel of a vehicle such as an automobile and its surroundings including a display device 1 of the embodiment of the present invention. FIGS. 2 and 3 are schematic sectional and perspective views respectively that explain the operation of the display device 1.

The display device 1 is made by applying the present invention to an instrument panel and to its surroundings on the driver's side of a transportation machine such as an automobile. Specifically, as shown in FIG. 2, the display device 1 includes a back wall 21 farthest from the viewpoint of a driver as a viewer V, a bottom wall 22, right and left side walls 23, and an upper wall 24 connecting to the back wall 21 and arranged to surround a space in front of the back wall 21 when viewed from the driver, and a display area 3 as a part of the instrument panel (instruments) on the back wall 21. The display area 3 is formed, for example, of a liquid crystal display on which what is called a speedometer is displayed to give information about speed to the driver. Not only a speedometer shown in FIG. 1 but various instruments may be displayed in the display area 3 on the back wall 21.

In the present embodiment, a dihedral corner reflector array 6 is provided as an imaging optical system of real specular image on the bottom wall 22 functioning as a wall part of the present invention. An object of view 4 (in the example of FIG. 1, characters displayed on a liquid crystal display) is arranged inside the bottom wall 22 (namely, in a second space under the lower surface of the bottom wall 22 and in which a second display region exists). A half mirror 8 is provided above the bottom wall 22 (namely, in a first space over the upper surface of the bottom wall 22 and in which a first display region exists). Each light beam emitted from the object 4 is reflected twice by the dihedral corner reflector array 6 (each dihedral corner reflector), and is further reflected by the half mirror 8 arranged in front of the back wall 21 and in the space over the upper surface of the bottom wall 22. Then, a real image is formed as a floating image 5 in front of the half mirror 8. The half mirror 8 also allows each light beam emitted from the display area 3 on the back wall 21 to pass therethrough to guide the light beam to the viewer V. In the example of FIG. 1, an image to be seen is characters "WARNING SPEED" displayed on the liquid crystal display when the speed of the automobile exceeds a certain level. Accordingly, a real image 5 containing the characters "WARNING SPEED" appears as a floating image in the space in front of the display area 3 on the back wall 21, while being superimposed on an indication on the display area 3. The half mirror 8 may be made by coating one surface of a transparent thin plate made, for example, of transparent resin or glass with a thin reflective film. The opposite surface of the transparent thin plate is subjected to an anti-reflection process (AR coating), so that the real image 5 to be seen does not become a double image.

As shown in FIGS. 1 to 3, the display device 1 of the present invention includes the dihedral corner reflector array 6 as an imaging optical system of real specular image, and the object 4 arranged in the second space (in which the second display region exists) opposite to the viewer V with respect to the dihedral corner reflector array 6. The display device further includes the half mirror 8 arranged in the first space (in which the first display region exists) as the viewer V with respect to the dihedral corner reflector array 6. Each light beam emitted from the object 4 passes through the dihedral corner reflector array 6 after being reflected twice by the dihedral corner reflector thereof, and is reflected further by the half mirror 8. Then, the real image is formed as a floating image 5 within the sightline of the viewer V. The angle of the half mirror 8 with respect to the dihedral corner reflector array 6 is controlled such that the light beam can pass through the dihedral corner reflector array 6 and the half mirror 8 is suitably guided to the viewer V. That is, the arrangement of the object 4, the dihedral corner reflector array 6 and the half mirror 8 is such that the light beam emitted from the object 4 is first reflected by the dihedral corner reflector array 6, and is then caused to travel to the half mirror 8.

In order to explain the aforementioned relationship in detail, the structure and the operation only of the dihedral corner reflector array 6 are described first. An operation realized by adding the half mirror 8 is described next.

Figure 4:
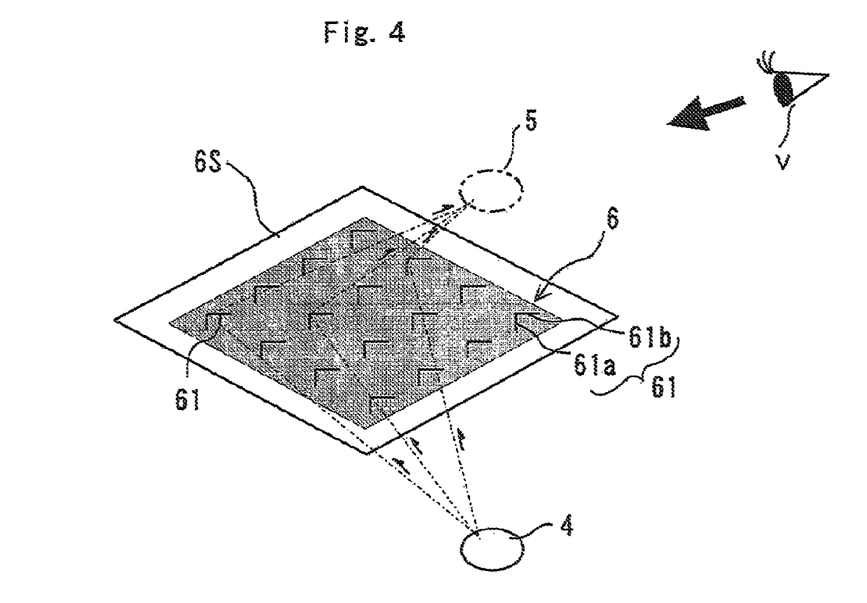
FIG. 4 is a schematic perspective view illustrating how an image is formed only by a dihedral corner reflector array applied to the embodiment.
Figure 5A:
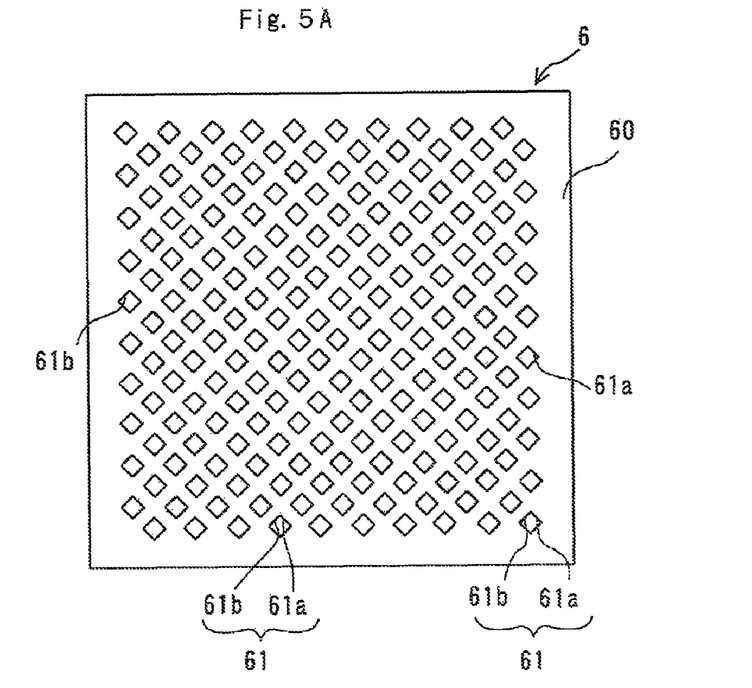
FIGS. 5A and 5B are a schematic plan view and a partial cutaway perspective view respectively illustrating a specific example of the structure of the dihedral corner reflector array applied to the display device of the embodiment.
Figure 5B:
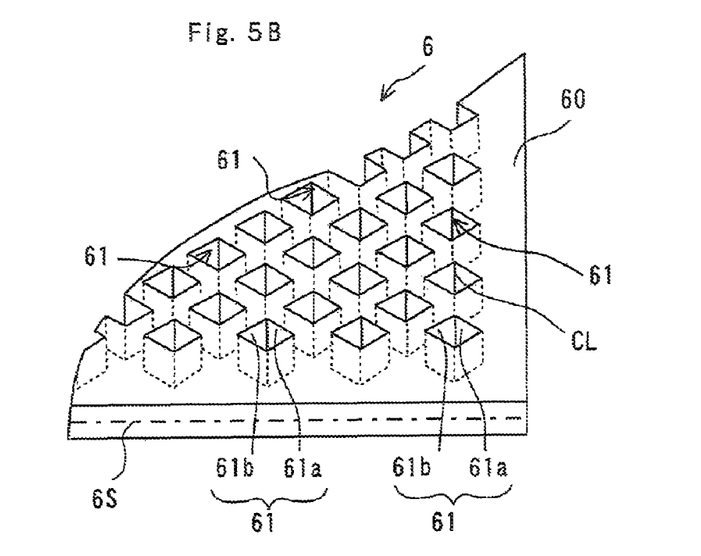

As is schematically shown in FIG. 4, the dihedral corner reflector array 6 is constructed of a large number of dihedral corner reflectors 61 each having two orthogonal mirror surfaces 61a and 61b. A flat surface substantially orthogonal to the two mirror surfaces 61a and 61b of each of the dihedral corner reflectors 61 is defined as an element surface 6S. The real image 5 of the object 4 is formed at a position plane-symmetrical to the object 4 with respect to the element surface 6S. In the present embodiment, the dihedral corner reflectors 61 are considerably small (on the order of micrometers) compared to the entire size (on the order of centimeters) of the dihedral corner reflector array 6. In FIG. 4, an aggregate of the dihedral corner reflectors 61 is shown in gray and a dihedral angle defined by the mirror surfaces are indicated by V shapes as showing an orientation of the interior corners thereof, so that the dihedral corner reflectors 61 are exaggeratedly shown in the figure. FIG. 5A is a schematic plan view of the dihedral corner reflector array 6, and FIG. 5B is a perspective view of part of the dihedral corner reflector array 6. In FIGS. 5A and 5B, the dihedral corner reflectors 61 and the mirror surfaces 61a, 61b are shown to be quite exaggerated in comparison to the entirety of the dihedral corner reflector array 6.

For the dihedral corner reflector array 6 to bend each light beam and allow the light beam to pass therethrough, a following optical element may be used, in which a large number of physical and optical holes are formed in the flat surface of a flat plate substrate 60 in such a manner that the holes vertically penetrate the substrate 60 in the thickness direction wherein two orthogonal ones of the inner wall surfaces of every hole is formed as mirror surfaces 61a and 61b in order to use the inner wall surfaces of each hole to function as the dihedral corner reflector 61. To provide the substrate 60 at least with a semi-transmitting property, as shown in FIGS. 5A and 5B, a large number of physical and optical holes (one side of which ranges from 50 µm to 200 µm, for example) substantially rectangular (square, for example) in plan view for allowing each light beam to pass therethrough are formed in the thin flat plate substrate 60. Then, the mirror surfaces 61a and 61b are formed by smoothing and mirror finishing of two orthogonal and adjacent ones of the inner wall surfaces of each hole. As a result, the dihedral corner reflectors 61 each have the two mirror surfaces 61a and 61b functioning as reflective surfaces are provided. It is preferable that some of the inner wall surfaces of the holes that are not to form the dihedral corner reflectors 61 be subjected to no mirror finishing so that they will be made non-reflective, or be angled so that they will produce no multiply reflected light beams. It is also preferable that the dihedral corner reflectors 61 be arranged on regularly aligned lattice points so that the internal angles defined by the mirror surfaces 61a and 61b will be all positioned in the same direction on the substrate 60. Accordingly, a line of intersection CL of the two orthogonal mirror surfaces 61a and 61b of each of the dihedral corner reflectors 61 is preferably orthogonal to the element surface 6S. In the below, the direction of the internal angle defined by the mirror surfaces 61a and 61b is called the orientation (direction) of the dihedral corner reflector 61.

Exemplary formation of the mirror surfaces 61a and 61b is as follows. A metallic mold is prepared first. Then, a process such as a nanoscale cutting process, a nanoimprint process that is a nanoscale press process using a mold, or electroforming is performed on the inner wall surfaces so that the inner wall surfaces function as the mirror surfaces 61a and 61b. The mirror surfaces 61a and 61b thereby formed are processed such that their surface roughness is equal to, or less than, 10 nm, and that they uniformly function as mirror surfaces in a visible light spectral range. When the substrate 60 is formed by electroforming with metal such as aluminum or nickel, the mirror surfaces 61a and 61b become natural mirror surfaces if the surface roughness of the mold is sufficiently small. When a nanoimprint process is used to apply resin and the like as a material of the substrate 60, mirror coating should be performed by a process such as sputtering to form the mirror surfaces 61a and 61b. Transmittance of light is enhanced by controlling a space between adjacent ones of the dihedral corner reflectors 61 to its minimum possible level. It is preferable that the upper surface (surface viewed from a viewer) of the dihedral corner reflector array 6 be subjected to a process such as coating with a low reflective material. The structure of the dihedral corner reflector array 6 is not limited to those described above. The structure of the dihedral corner reflector array 6 and a method of forming the same may suitably be employed, as long as a large number of dihedral corner reflectors 61 are each formed by the two orthogonal mirror surfaces 61a and 61b, and the dihedral corner reflectors 61 each function as an optical hole for allowing each light beam to pass therethrough.

In each of the dihedral corner reflectors 61 constituting the dihedral corner reflector array 6, light beams entering the corresponding hole via the rear side are reflected by one mirror surface 61a (or 61b). The reflected light beam is further reflected by the other mirror surface 61b (or 61a), and is then caused to pass through the dihedral corner reflector 61 via the front side. A path along which each light beam enters the dihedral corner reflector 61 and a path along which the light beam exits the dihedral corner reflector 61 are plane-symmetrical to each other with respect to the element surface 6S. Specifically, assuming that the element surface 6S is a surface passing the central portion of the height of each mirror surface and orthogonal to each mirror surface, the element surface 6S is a plane of symmetry with respect to which the position of the real image formed as a floating image, i.e., real specular image 5 of the object 4 is plane-symmetrical to the object 4.

Briefly described next together with a path of each light beam emitted from a point light source (o) as an object of view is how an image is formed by the dihedral corner reflector array 6.

Figure 6:
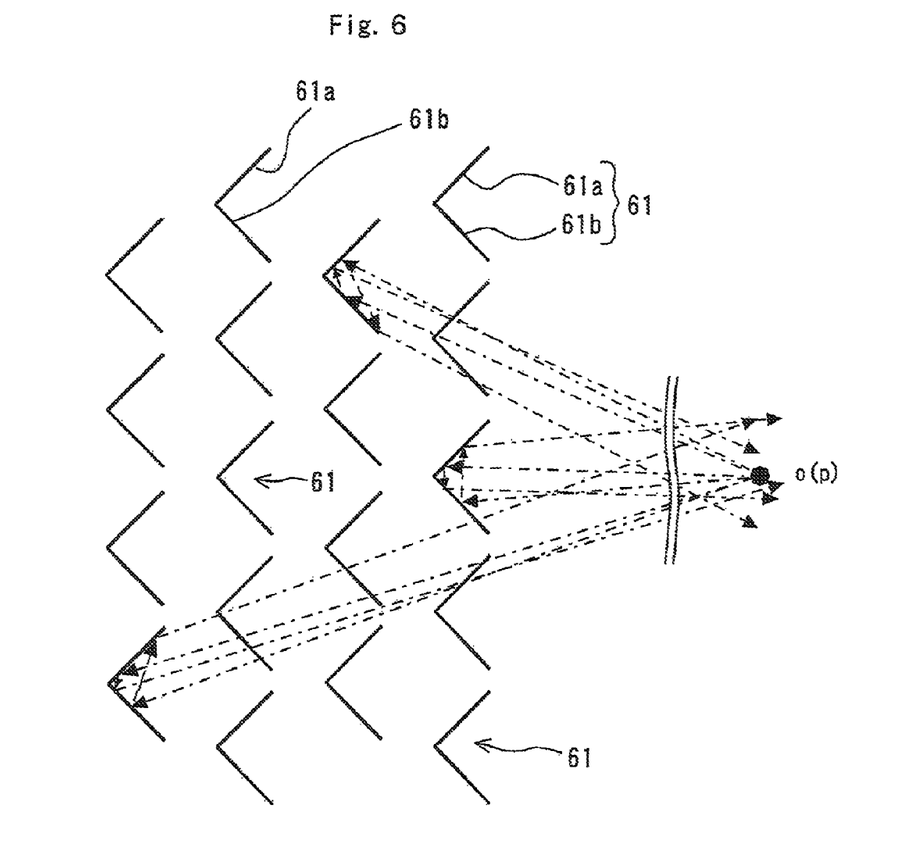
FIG. 6 is a schematic plan view illustrating how an image is formed by the dihedral corner reflector array applied to the display device of the embodiment.
Figure 7:
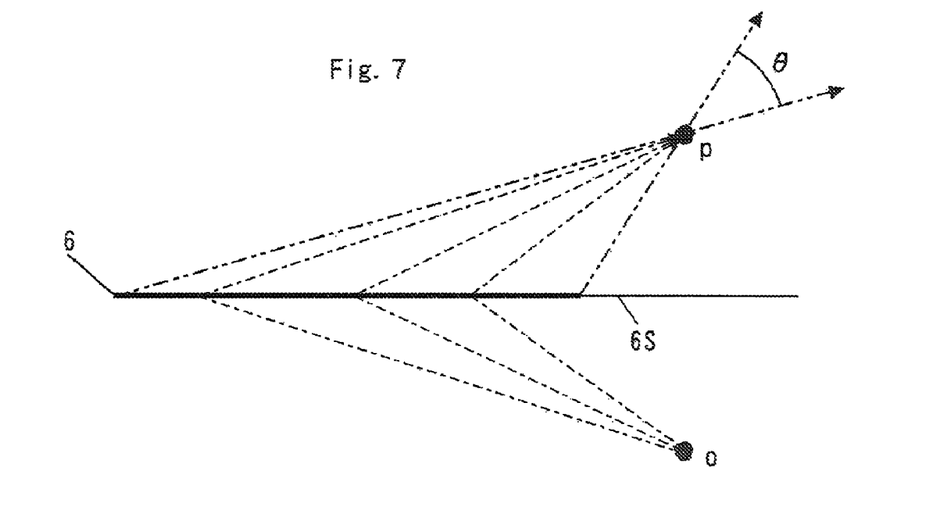
FIG. 7 is a schematic side view illustrating how an image is formed by the dihedral corner reflector array applied to the display device of the embodiment.

As is schematically shown in the plan view of FIG. 6 and in the side view of FIG. 7, when passing through the dihedral corner reflector array 6, light beams emitted from the point light source (o) (indicated by one-dot arrowed chain lines traveling from the back toward the front on the drawing when viewed three-dimensionally in FIG. 6) are each reflected once by one mirror surface 61a (or 61b), and is reflected further by the other mirror surface 61b (or 61a) of each of the dihedral corner reflectors 61. Next, the reflected light beams pass through the element surface 6S (FIGS. 7, 4 and 5B), and then pass in dispersion a point that is plane-symmetrical to the point light source (o) with respect to the element surface 6S of the dihedral corner reflector array 6. Incoming light beams and reflected light beams are shown to be parallel in FIG. 6. The reason therefor is as follows. In FIG. 6, the dihedral corner reflectors 61 are shown to be exaggeratedly large in comparison to the point light source (o). However, the actual size of the dihedral corner reflectors 61 is considerably small. Accordingly, incoming light beams and reflected light beams nearly overlap each other when the dihedral corner reflector array 6 is viewed from above. (In FIG. 6, paths of light beams that first fall on both of the two mirror surfaces (61a, 61), namely, two paths, of each of the dihedral corner reflectors 61 are shown. In FIG. 7, only one light beam that first falls on either of the mirror surfaces is shown in order to avoid complication.) In summary, light beams converge to a position plane-symmetrical to the point light source (o) with respect to the element surface 6S, so that a real image is formed at a position (p) shown in FIGS. 6 and 7.

FIG. 7 shows optical paths along which light beams emitted from an object of view travel through the dihedral corner reflector array 6 to reach a space of the position (p) plane-symmetrical to the object with respect to the element surface 6S, so that a real specular image is formed at the space. Two paths indicated by the two-dot chain lines in FIG. 7 are optical paths passing through opposite edge surfaces of the dihedral corner reflector array 6 (front and back edge surfaces when viewed from the viewer V). Since the dihedral corner reflector array 6 should exist behind a real image formed at the position (p), a real image can be viewed from the viewer within an angular range (angle θ) defined by these two two-dot chain lines. Conversely, a real image cannot be viewed if it is out of this range.

Figure 8:
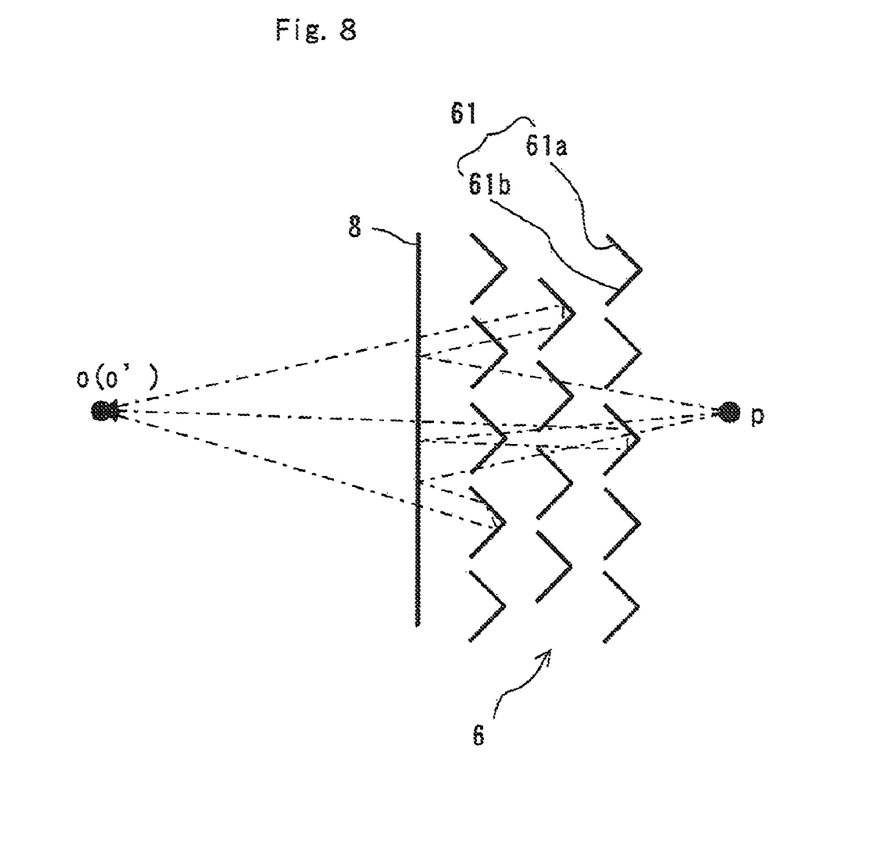
FIG. 8 is a schematic plan view illustrating how an image is formed by combination of a half mirror with the dihedral corner reflector array applied to the display device of the embodiment.
Figure 9:
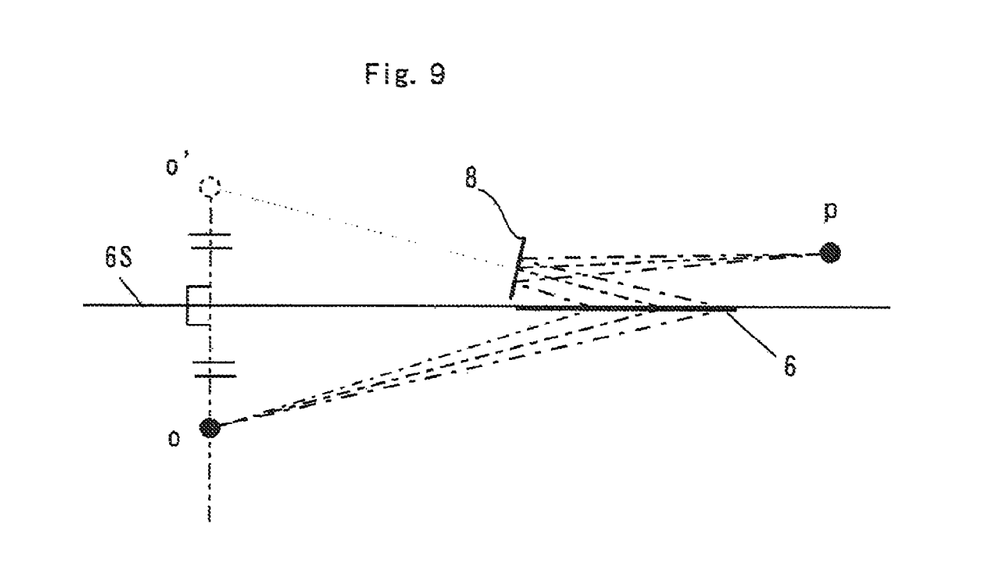
FIG. 9 is a schematic side view illustrating how an image is formed by combination of the half mirror with the dihedral corner reflector array applied to the display device of the embodiment.

FIGS. 8 and 9 respectively corresponding to FIGS. 6 and 7 explain the operation realized by adding the half mirror 8 in the first space in which the first display region exists. Although FIG. 6 shows paths of light beams that first fall on both of the two mirror surfaces (61a, 61b) of each of the dihedral corner reflectors 61 are shown (namely, two paths are shown), but in FIG. 8, only one light beam that first falls on either of the mirror surfaces is shown in order to avoid complication. A basic concept is as follows. Each light beam emitted from the point light source (o) first passes through one of the dihedral corner reflectors 61 after being reflected twice at the dihedral corner reflector 61. The reflected light beam is then caused to turn back by the planar half mirror 8 arranged on the path of the light beam traveling toward the viewer V. As a result, a real image is formed at the position (p). Specifically, a relationship between a real image at the position (p) shown in FIGS. 6 and 7 and a real image at the position (p) shown in FIGS. 8 and 9 is the same as a relationship between an object (corresponding to the real image at the position (p) shown in FIGS. 8 and 9) and a virtual image (formed at a position (o') shown in FIGS. 8 and 9 and corresponding to the real image at the position (p) shown in FIGS. 6 and 7) when the half mirror 8 is viewed from the side of the dihedral corner reflector array 6. Change in the location and the angle of the half mirror 8 (the angle to be defined with the dihedral corner reflector array 6) can change the direction of view.

FIGS. 1 and 2 each show a relationship among the dihedral corner reflector array 6, the half mirror 8 and the object 4 defined by adding the half mirror 8 of the present embodiment. As is understood from the foregoing description of the embodiment, the real image 5 is formed as a floating image in the air in front of the display area 3 on the back wall 21, and in the sightlines of the half mirror 8 and the viewer V.

Figure 10:
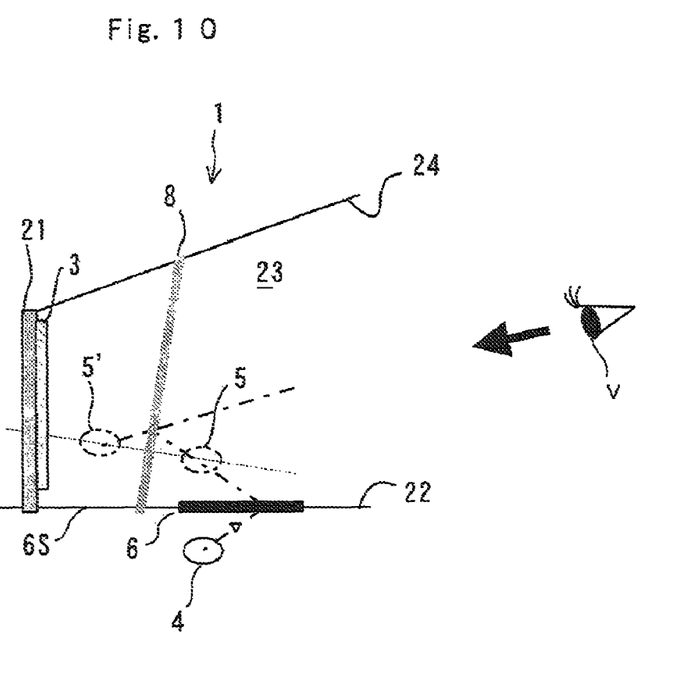
FIGS. 10 to 12 are schematic cross-sectional side views illustrating principal parts of display devices of respective other embodiments according to the present invention when viewed from a side.

In the embodiment described so far, a real image is formed in the space between the half mirror 8 and the viewer V. FIG. 10 shows another embodiment in which a real image is formed in a space between the dihedral corner reflector array 6 and the half mirror 8. In this case, the viewer V sees a real image 5 as a virtual image formed by the half mirror 8.

As shown in FIG. 10, each light beam emitted from the object 4 passes through the dihedral corner reflector array 6 after being reflected twice by the dihedral corner reflector array 6. Then, a real image of the object 4 is formed as the floating real image, i.e., real specular image 5 at a position symmetrical to the object 4 with respect to the dihedral corner reflector array 6. The viewer V sees a resultant virtual image 5' reflected from the specular image 5 by the half mirror 8. That is, the viewer V sees the floating image 5' formed behind the half mirror 8 (formed in a space behind the half mirror surface) that is a virtual image of the specular image 5.

Figure 11:
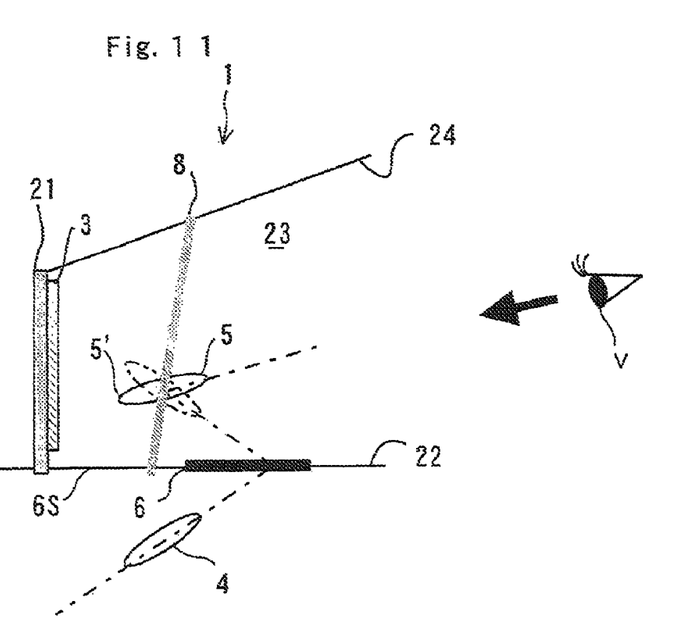

FIG. 11 shows a still another embodiment in which a specular image is formed at the position of a half mirror.

An object of view has a limited size. Accordingly, if a specular image 5 is formed on the mirror surface of the half mirror 8, a viewer sees both the specular image 5 and a virtual image 5' formed by the half mirror 8 as shown in FIG. 11.

Each light beam emitted from the object 4 passes through the dihedral corner reflector array 6 after being reflected twice by the dihedral corner reflector array 6. Then, a real image of the object 4 is formed as a floating image, i.e., specular image at a position symmetrical to the object 4 with respect to the dihedral corner reflector array 6. In the present embodiment, the half mirror 8 is arranged at nearly the center of the floating image. Accordingly, the viewer V sees part of the object farther from the dihedral corner reflector array 6 as the real image 5, while seeing part of the object closer to the dihedral corner reflector array 6 as the virtual image 5'. That is, if the half mirror 8 is arranged to cross the real image 5 of the object, the viewer V sees an aerial image sticking in the mirror surface of the half mirror 8.

As described above, by changing the arrangement of the object 4, the dihedral corner reflector array 6 and the half mirror 8 in various ways, an aerial image provided to the viewer V is formed in front of or behind the mirror surface of the half mirror 8, or on the mirror surface of the half mirror 8 (as an image sticking in the mirror surface).

Figure 12:
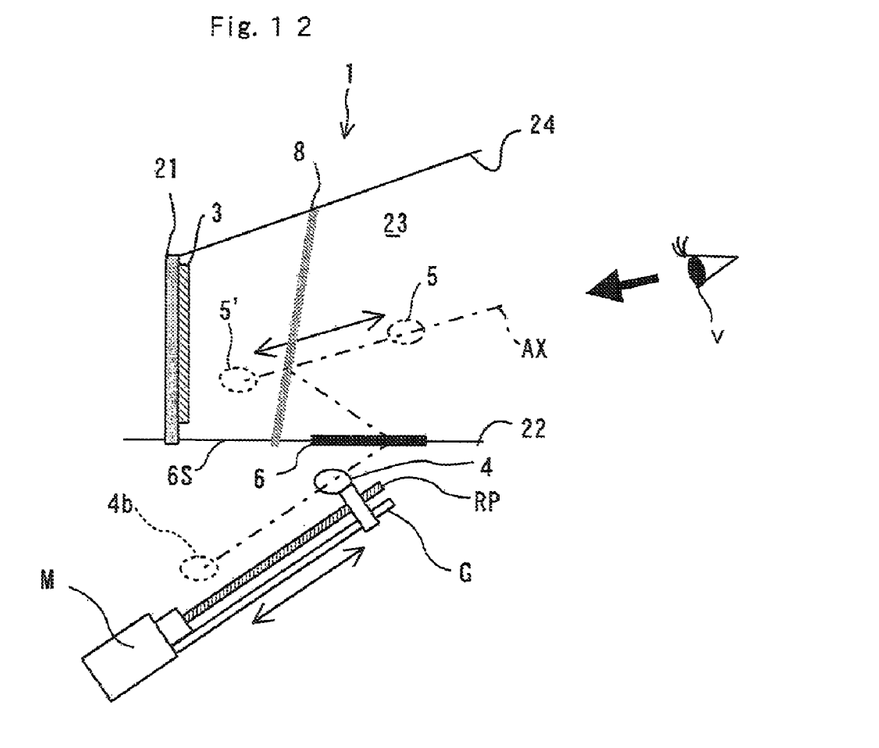

In order to positively take advantage of this feature, a positional relationship thereamong may be changed with time. FIG. 12 shows a yet another embodiment in which an object of view is mechanically moved along a line connecting the object and an imaging optical system of real specular image by using a guide translation mechanism RP such as a combination of a guide rail, a motor, and a rack-and-pinion or worm-and-nut guide mechanism.

As shown in FIG. 12, an object of view 4 is attached to a sliding part that slidably travels along a guide rail G parallel to an optical axis AX so that an aerial image of the object can be moved along the sightline of a viewer V (along the optical axis AX). The object 4 can be moved linearly by a motor M and the guide translation mechanism RP. As an example, a real image is formed in a space between the half mirror 8 and the viewer V when an object of view 4b is far from the dihedral corner reflector array 6. In this case, the viewer V sees a real image 5 thereby formed. A real image is formed in a space between the half mirror 8 and the dihedral corner reflector array 6 when the object 4 is close to the dihedral corner reflector array 6. In this case, the viewer V sees a virtual image 5' formed in the half mirror 8. Thus, if there is used means for changing a positional relationship among the object of view, the dihedral corner reflector array 6 and the half mirror 8 with time, then the viewer V is allowed to see an aerial image that is continuously moved between the space behind and the space in front of the mirror surface of the half mirror 8.

If a plurality of compact light sources (not shown) such as LEDs are arranged in line as objects of view, and are turned on sequentially to control a source of light, a viewer can see similar movement of an aerial image without necessitating actual movement of an object of view itself.

Figure 13:
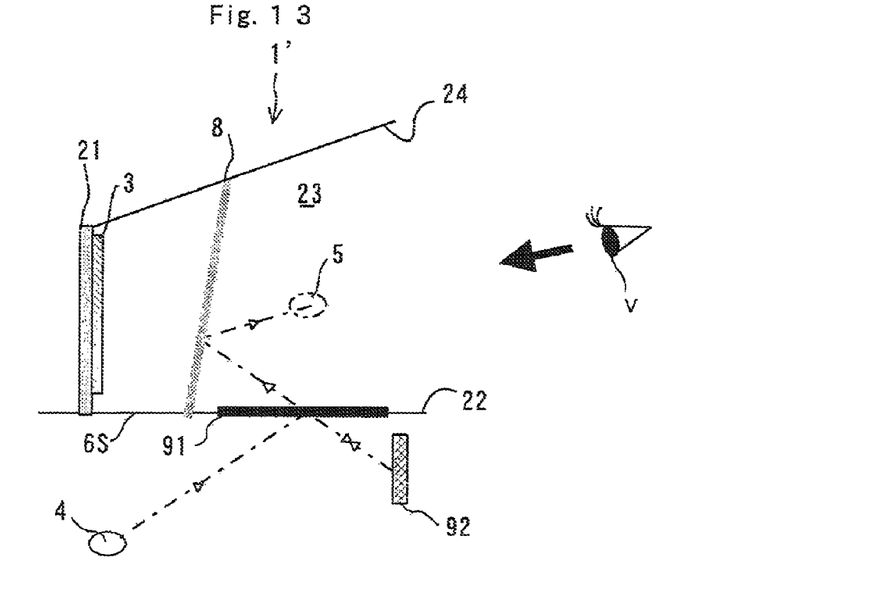
FIG. 13 is a schematic cross-sectional side view illustrating how a light beam is retro-reflected by a retroreflector array and retroreflectors applied to an imaging optical system of real specular image of another embodiment according to the present invention.

FIG. 13 schematically shows a still another embodiment of a display device to which the present invention is applied. A display device 1' differs only in an imaging optical system of real specular image from the display device 1 of the foregoing embodiments. Accordingly, structural elements of the display device 1' same as those of the display device 1 are described with the same names and the same reference numerals adapt.

An imaging optical system of real specular image 9 adapted to the present embodiment is formed by combining a second half mirror 91 and a retroreflector array 92. A surface of the half mirror has an element surface 6S functioning as a plane of symmetry. An object of view 4 is arranged in a space opposite to a viewer V (in which a second display region exists) with respect to the second half mirror 91. The retroreflector array 92 is also arranged in the space opposite to the viewer V. A half mirror 8 is arranged in a space in which the viewer V exists (in which a first display region exists). Each light beam emitted from the object 4 is reflected by the second half mirror 91, and is then guided to the retroreflector array 92. The retroreflector array 92 has a function to cause retroreflection of each light beam from the second half mirror 91. Accordingly, the light beam guided to the retroreflector array 92 returns to the half mirror 91. After passing through the second half mirror 91, the light beam travels to the half mirror 8 arranged in the space in which the viewer V exists. Next, the light beam is caused to turn back by the half mirror 8, so that a real image 5 is formed in a space within the sightline of the viewer V. The angle of the half mirror 8 is suitably set so that each light beam from the second half mirror 91 can be guided to the viewer V.

The second half mirror 91 may also be made by coating one surface of a transparent thin plate made, for example, of transparent resin or glass with a thin reflective film. The opposite surface of the transparent thin plate is subjected to an anti-reflection process (i.e., AR coating), thereby preventing the real image 5 to be seen from becoming a double image. In addition, an optical film (not shown) with functions such as a visibility control film or a view angle control film may be attached onto the upper surface of the second half mirror 91 as sightline control means, in which the visibility control film diffuses only light beams in certain directions and the visible angle control film cuts off only light beams in certain directions but both allow light transmission in other certain directions. Specifically, such an optical film prevents a light beam after directly passing through the second half mirror 91 from reaching a place except the viewpoint of the viewer V, so that an image of an object of view reflected in the half mirror 8 cannot be seen directly from any place except the viewpoint of the viewer V through the second half mirror 91. Whereas, the optical film also allows only a through-passing of light beams traveling in the direction from the retroreflector array 92 through the second half mirror 91, after being reflected once by the second half mirror 91 and retro-reflected by the retroreflector array 92, as described below, so that only the real image 5 can be seen from the viewpoint of the viewer V.

Figure 14A:
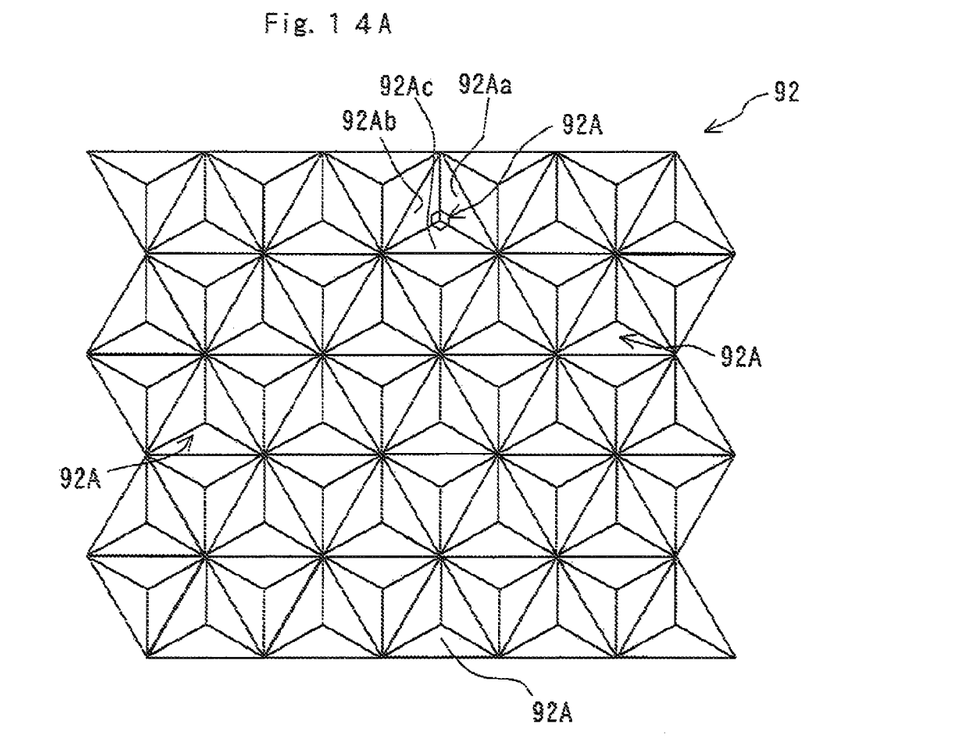
FIG. 14A is a schematic partial plan view illustrating a retroreflector array applied to the imaging optical system of real specular image.
Figure 14B:
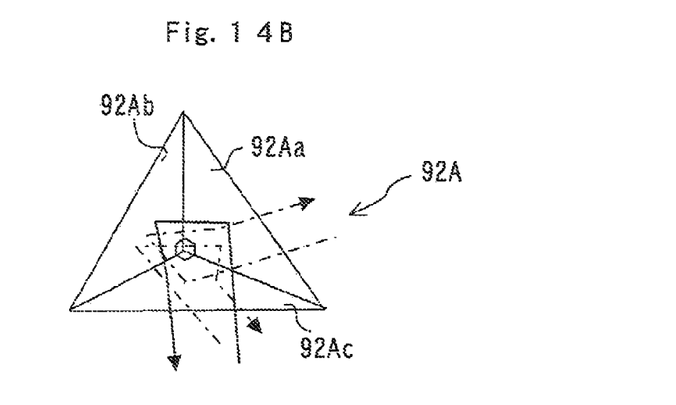
FIG. 14B is a schematic enlarged partial plan view illustrating how a light beam is retro-reflected by an exemplary retroreflector of the retroreflector array shown in FIG. 14A.

Whereas, the retroreflector array 92 may be of any type as long as it strictly causes retroreflection of an incoming light beam. The retroreflector array 92 may be formed by applying a retroreflective material or a retroreflective coating to a material surface. Furthermore, the retroreflector array 92 may have a curved surface, or a flat surface. FIG. 14A is a front view showing part of the retroreflector array 92 in an enlarged manner. The retroreflector array 92 shown in FIG. 14A is a corner cube array as an aggregate of corner cubes each utilizing one of the internal angles of a cube. Retroreflectors 92A is a corner cube array consisting of a regulated set of corner cubes, each of which is obtained as one inner corner of a cube. Each retroreflector 92A is formed by concentrating three mirror surfaces 92Aa, 92Ab and 92Ac, in the shape of identically shaped and sized isosceles right triangles joined at a common point, showing an equilateral triangle shape when seen from the front; with those three mirror surfaces 92Aa, 92Ab and 92Ac are orthogonal to each other to form one common corner cube (FIG. 14B).

Figure 15A:
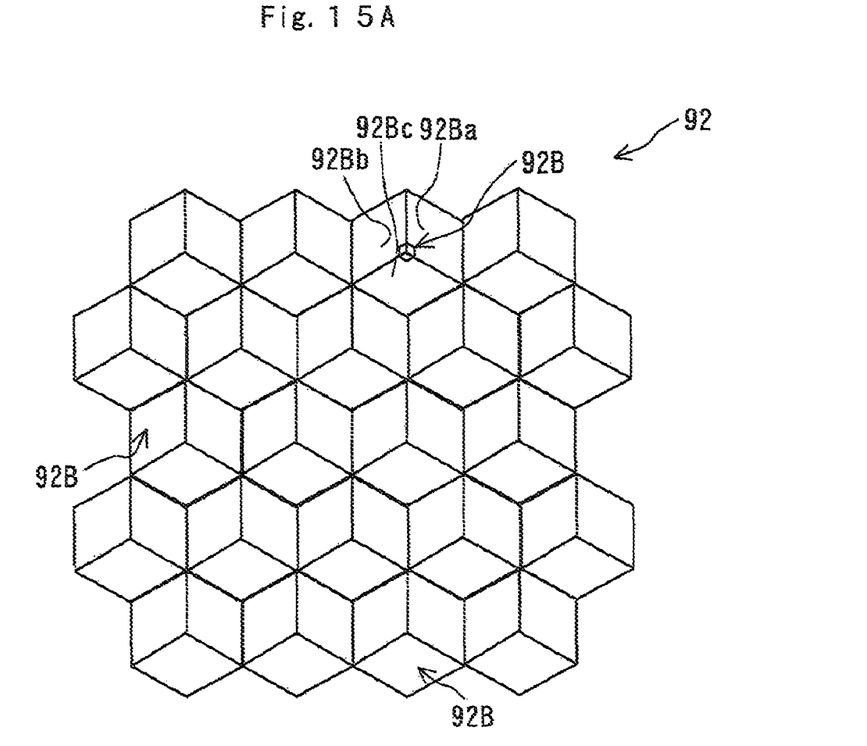
FIG. 15A is a schematic partial plan view illustrating another retroreflector array applied to the imaging optical system of real specular image.
Figure 15B:
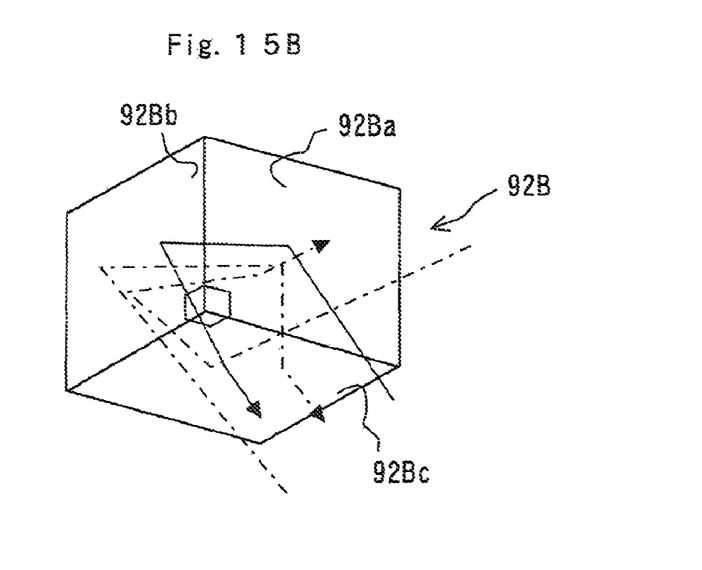
FIG. 15B is a schematic enlarged partial plan view illustrating how a light beam is retro-reflected by an exemplary retroreflector of the retroreflector array shown in FIG. 15A.

FIG. 15A is also a front view showing part of the retroreflector array 92 in an enlarged manner. The retroreflector array 92 shown in FIG. 15A is also a corner cube array as a regulated aggregate of corner cubes each utilizing one of inner corners of a cube. Retroreflectors 92B each have a shape of a equilateral hexagon, when viewed from the front, formed by concentrating three mirror surfaces 92Ba, 92Bb and 92Bc in the form of squares of the same shape and the same size joined at a common point. The three mirror surfaces 92Ba, 92Bb and 92Bc are orthogonal to each other (FIG. 15B).

Although the retroreflector arrays 92 shown in FIGS. 14A and 15A are different in shape, their principles of retroreflection are the same. FIGS. 14B and 15B explain the principles of retroreflection of the retroreflector arrays 92 shown in FIGS. 14A and 15A, respectively. A light beam entering one of the mirror surfaces (92Aa or 92Ba, for example) of the retroreflector 92A or 92B is sequentially reflected by a different mirror surface (92Ab or 92Bb), and by the other mirror surface (92Ac or 92Bc). Accordingly, the light beam is reflected back to a place from which it entered the retroreflector 92A or 92B. A path of a light beam entering the retroreflector array 92 and a path of a light beam exiting the retroreflector array 92 do not overlap, but in a strict sense, parallel to each other. If the retroreflector 92A or 92B is sufficiently small compared to the retroreflector array 92, paths of incident and outgoing light beams may be considered as overlapping each other. These two types of corner cube arrays differ from each other in the following. The corner cube array with mirror surfaces in the form of isosceles triangles is relatively easy to make but is somewhat low in reflectivity, while the corner cube array with mirror surfaces in the form of squares is relatively difficult to make but is high in reflectivity.

An alternative to the aforementioned corner cube arrays may be used as the retroreflector array 92, as long as the alternative (that is called a "corner reflector" in abroad sense) causes retroreflection of a light beam by using three mirror surfaces. While it is not shown here, for instance, an exemplary unit retroreflector to be applied in the embodiments has three mirror surfaces, two of which are orthogonal to each other, and the other is at an angle 90/N (N is an integer) degrees with respect to the other two. Another example of the unit retroreflector is an acute angle retroreflector with three mirror surfaces, where angles defined between adjacent ones of the mirror surfaces are 90, 60 and 45 degrees. A cat's eye retroreflector may also be applied as the unit retroreflector. These retroreflector arrays may be planar, curved, or warped. The location of the retroreflector array may suitably be determined, as long as a light beam emitted from an object of view and reflected by the second half mirror 91 is retro-reflected by the retroreflector array.

In the display device 1' having the second half mirror 91 and the retroreflector array 92, similarly in the display device 1 having a dihedral corner reflector array, a real image 5 is seen as an image floating in a space within the sightline of a viewer in a direction slanting to the mirror surface of the half mirror 91. The display device 1' can also make variations of the real image 5 by changing the position at which an image to be formed is displayed, or by changing the size of an image to be seen.

The specific structure of each constituent part of the display device may suitably be changed without departing from the purport of the present invention. As an example, the present invention is applied to a display device for making a floating image in a space in front of a display part of the display device.

The present invention is applicable as a display device for advertising purposes, and as an information display device for use in vehicles.

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed embodiments but may be practiced within the full scope of the appended claims.

This application is based upon and claims the benefit of priority from the prior Japanese Patent Application No. 2009-222341, filed Sep. 28, 2009, the entire contents of which are incorporated herein by reference.

What is claimed is:

1. A display device, comprising:
a display part arranged in a first display region to be visually recognized by a viewer in the first display region;
an object of view arranged in a second display region;
an imaging optical system of real specular image including a semitransparent substrate with a plane of symmetry disposed between the first display region and the second display region to define the first display region and the second display region, the imaging optical system of real specular image forming a real image of the object of view in the first display region with light passing through the substrate; and
a first half mirror arranged between the display part and the viewer in the first display region, the first half mirror reflecting the light being passed through the substrate to form the real image, while allowing the viewer to see an image formed on the display part in the first display region.

2. The display device according to claim 1, further comprising means for changing a positional relationship among the object, the imaging optical system of real specular image and the first half mirror with time to change a position of the real image of the object with time.

3. The display device according to claim 2, further comprising means for moving the object along a line connecting the object and the imaging optical system of real specular image.

4. The display device according to claim 1, wherein the first half mirror is arranged to cross the real image of the object.

5. The display device according to claim 1, wherein the imaging optical system of real specular image is an optical element functioning as a dihedral corner reflector array.

6. The display device according to claim 1, wherein the imaging optical system of real specular image comprises:
a second half minor included in the substrate and a retroreflector array,
wherein the second half mirror reflects the light from the object to the retroreflector array,
wherein the retroreflector array reflects the reflected light from the second half mirror back to the second half mirror, and
wherein the second half mirror allows the reflected light from the retroreflector array to pass through the second half mirror.

* * * * *